A. AFANADOR.
STEERING DEVICE.
APPLICATION FILED AUG. 31, 1915. RENEWED OCT. 30, 1916.
1,213,057.
Patented Jan. 16, 1917.
2 SHEETS—SHEET 1.
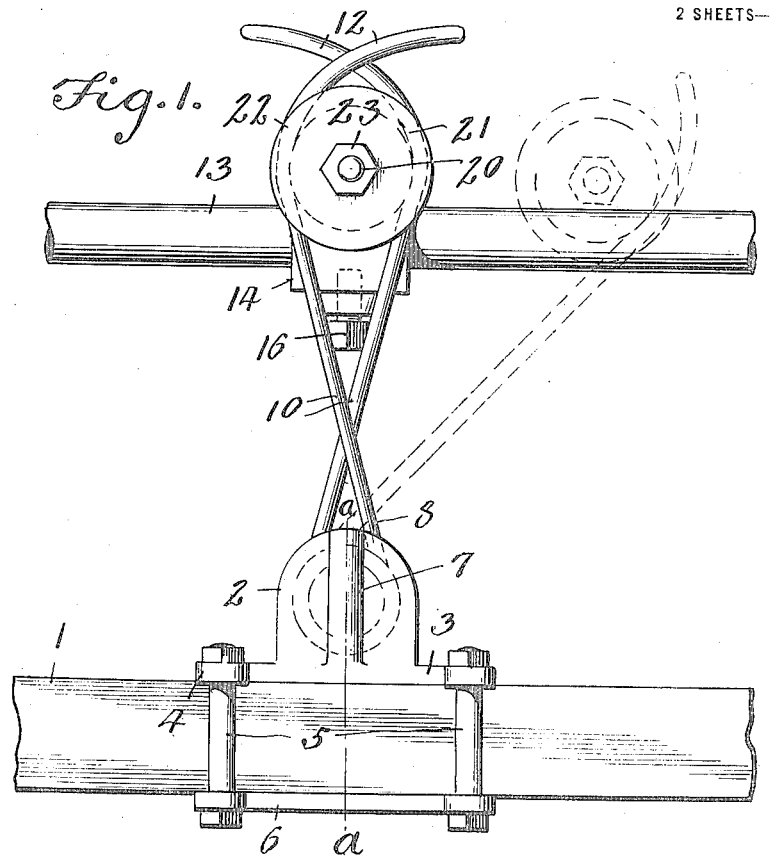
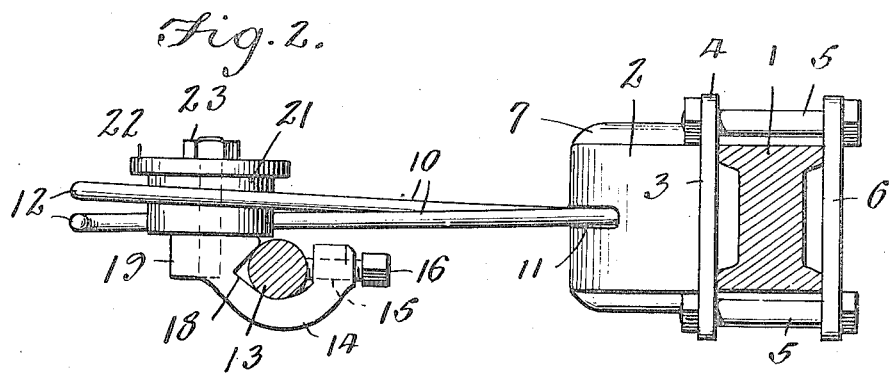

A. AFANADOR.
STEERING DEVICE.
APPLICATION FILED AUG. 31, 1915. RENEWED OCT. 30, 1916.
1,213,057.  
Patented Jan. 16, 1917.
2 SHEETS—SHEET 2.
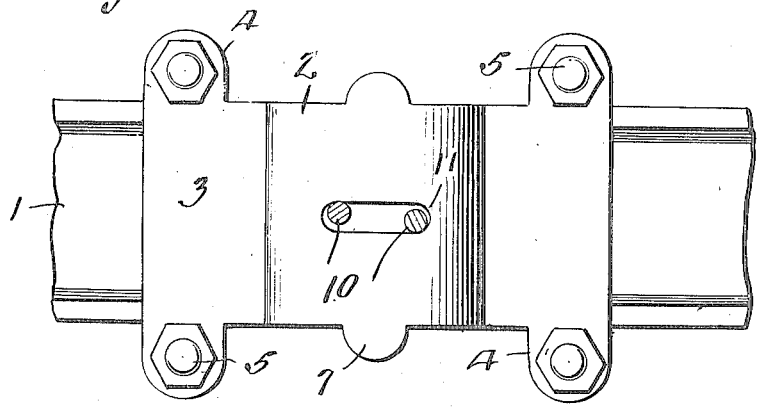
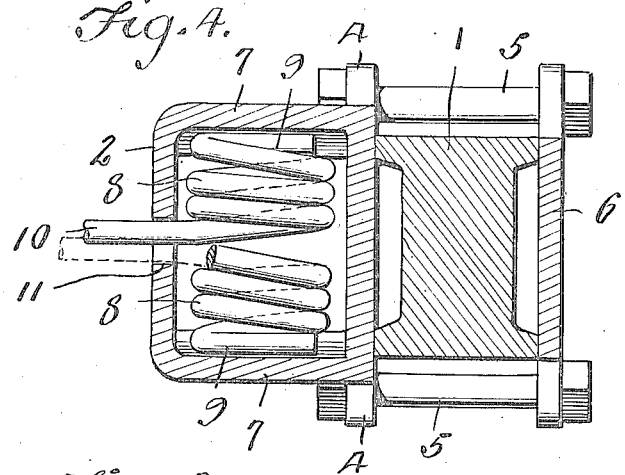
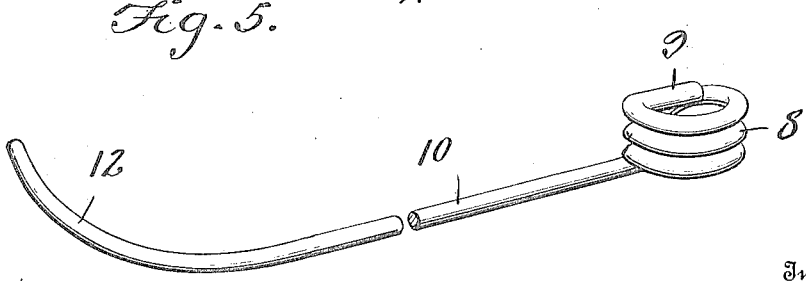
Inventor  
A. Afanador,  
By Victor J. Evans  
Attorney
Witness

UNITED STATES PATENT OFFICE.

ANGEL AFANADOR, OF LINCOLN, NEBRASKA.

STEERING DEVICE.

1,213,057. Specification of Letters Patent. Patented Jan. 16, 1917.

Application filed August 31, 1915, Serial No. 48,247. Renewed October 30, 1916. Serial No. 128,636.

*To all whom it may concern:*

Be it known that I, ANGEL AFANADOR, a citizen of the United States, residing at Lincoln, in the county of Lancaster and State of Nebraska, have invented new and useful Improvements in Steering Devices, of which the following is a specification.

My invention relates to steering devices for motor vehicles, and has particular application to an attachment whereby the operator may be permitted to release the steering wheel and the vehicle will be automatically steered directly ahead.

The primary object of my invention is to provide a device of this character whereby the front wheels of the vehicle will be kept straight ahead, under normal conditions, and will automatically return the wheels to this position after having been moved for steering purposes or when moved by obstructions of any description.

Another object of my invention is to provide a device of this character which is simple, efficient and durable in its construction and which may be attached to a motor vehicle of any description.

Another object of my invention is to provide a device of this character which is so constructed as to permit the substitution of the different elements in case they become worn, broken or distorted.

With these and other objects in view, the invention consists in the features of construction, combination and arrangement of parts hereinafter described and claimed, reference being had to the accompanying drawings, in which:

Figure 1 is a top plan view of my device, showing it applied to a motor vehicle and showing in dotted lines the resultant action of one of the spring arms when the steering rod is moved; Fig. 2 is a transverse section through the axle and the steering rod, showing my device in side elevation; Fig. 3 is a top plan view of the housing, showing the spring arms in section; Fig. 4 is a transverse section of the housing taken on the line *a—a;* and Fig. 5 is a detail perspective view of one of the coiled springs.

Referring to the drawings in detail, 1 designates an axle of a motor vehicle of a common construction. Secured to the medial portion of the axle on the rear wall thereof is a housing 2 which is substantially U-shaped and has the terminal portions of the parallel arms provided with laterally extending flanges 3, said flanges being provided with ears 4 which are arranged on the opposite ends of each flange and receive one end of bolts 5. The bolts 5 are adapted to engage the sides of the axle and have their opposite extremities secured to a plate 6, thereby retaining the housing securely upon the axle. The upper and lower walls of the housing are provided with semi-circular recesses 7 on the interior thereof which extend throughout the major portion of the length of the sides and which are arranged in vertical alinement with each other. Mounted within the housing 2 and arranged in superimposed position are coiled springs 8 which have their extremities 9 bent at substantially right angles and lie within the recesses 7. The extremities of the coils being secured within the recesses 7, resists the torsion of the springs. The adjacent extremities 10 of each of the coils 9 extend rearwardly through the opposite ends of the slot 11 which is provided in the rear wall of the housing 2. The extremities 10 extend from the coils 8 at a tangent and cross each other at a distance from the coils and have the end portions thereof bent in opposite directions to form arcuate shaped terminals 12. Secured to the steering rod 13 in horizontal alinement with the housing 2 is a U-shaped bracket 14 which has one extremity thereof provided with a transverse opening 15 which threadedly receives a set screw 16, the inner end of the screw contacting with the wall of the steering rod. The inner wall of the opposite extremity of the bracket 14 is provided with an angular depression 18 which forms a spur or projection 19, coöperating with the set screw to retain the bracket rigidly and securely upon the steering rod against movement thereon. The last mentioned extremity of the bracket 14 is adapted to receive the lower extremity of a vertically arranged bearing 20 upon which is journaled a roller 21 which has its upper edge provided with a laterally extending annular flange 22. The outer end of the bearing 20 is provided with a nut 23 to confine the roller upon the bearing and prevent excessive longitudinal movement of the same. As shown in Fig. 2, the terminals 12 of the spring arms 10 engage the periphery of the roller 21 on opposite sides thereof, the coils exerting their tension upon the extremities to normally keep the terminals 12 in engagement with the surface of the roller. The annular flange 22 formed on the roller 21 coöperates with the steering rod to limit the vertical movement of the terminals to prevent the same from becoming accidentally displaced from the roller.

From the foregoing construction, it will be seen that when the steering wheel of the motor vehicle is rotated in either direction, longitudinal movement will be imparted to the steering rod 13, the direction of movement depending upon which way the steering wheel is turned. Assuming that the steering rod is moved to the right, the roller being securely mounted thereon, a corresponding movement will be imparted thereto. The terminal portions 12 of the spring arms 9 engage the opposite surfaces of the roller 21 so that when the steering rod is moved as just described the terminal contacting with the right side of the roller 21 will be moved in the same direction as the roller, against the tension of its coil 8, as shown in Fig. 1. The roller, being rotatably mounted upon the bearing 20, will be rotated during movement of the steering rod, thereby eliminating friction between the roller and the terminals 12. Upon releasing the steering wheel the force exerted upon the terminal 12 will exert pressure upon the roller 21, thereby forcing the steering rod back to its normal position. This will cause the wheels of the vehicle to turn to normal position, thereby causing the vehicle to be steered directly ahead. It will be noted that the terminals 12 being formed to describe an arc will cause the spring arms to engage a large surface of the roller, thereby exerting maximum tension upon the roller and retaining the steering rod in its normal position. When reverse movement is imparted to the steering wheel and consequently the steering rod a corresponding movement will be imparted to the other extremity 10 of the coil. It will be seen that when the steering rod is moved either to the right or to the left the extremities of the coils 8 will exert their force in returning the steering rod to its normal position. It is of course understood that a similar action will occur when the wheels of the vehicle are moved from the center or deviated from their course due to obstructions of any description, such as uneven roads and the like. The springs 8 being detachably connected with the housing 2, permit the former to be removed from the latter and thereby allow the substitution of new springs in case they have lost their force and fail to perform their proper function.

It is thought from the foregoing that the construction and operation of my device will be readily apparent to those skilled in the art and that minor changes in size, shape, proportion and minor details of construction may be made without departing from the scope or spirit of the hereunto appended claims.

Having thus described my invention, I claim:

A steering gear attachment for motor vehicles comprising a housing secured to the rear wall of the axle and having a slot formed in the rear wall of said housing, depressions formed in the upper and lower walls of said housing, coiled springs within said housing and having the adjacent extremities thereof extending through said slot and rearwardly therefrom, each of the remaining extremities being bent at right angles to said coils and lying in said depressions, a roller journaled on the steering rod and lying between the adjacent extremities of the steering rod.

In testimony whereof I affix my signature in presence of two witnesses.

ANGEL AFANADOR.

Witnesses:
G. E. MILLS,
E. B. STELSON.